May 11, 1943.     E. D. McARTHUR     2,319,072
ELECTRIC VALVE FREQUENCY CHANGER
Original Filed Aug. 17, 1940     3 Sheets-Sheet 1

Inventor:
Elmer D. McArthur,
by Harry E. Dunham
His Attorney.

May 11, 1943.                E. D. McARTHUR                2,319,072
ELECTRIC VALVE FREQUENCY CHANGER
Original Filed Aug. 17, 1940    3 Sheets-Sheet 2

Inventor:
Elmer D. McArthur,
by Harry E. Dunham
His Attorney.

May 11, 1943.　　　　　E. D. McARTHUR　　　　　2,319,072
ELECTRIC VALVE FREQUENCY CHANGER
Original Filed Aug. 17, 1940　　　3 Sheets-Sheet 3

Patented May 11, 1943

2,319,072

UNITED STATES PATENT OFFICE 2,319,072

ELECTRIC VALVE FREQUENCY CHANGER

Elmer D. McArthur, Schenectady, N. Y., assignor to General Electric Company, a corporation of New York Original application August 17, 1940, Serial No. 353,133. Divided and this application April 15, 1941, Serial No. 388,702

16 Claims. (Cl. 250—36)

My invention relates to electric valve frequency changers and more particularly to electric valve circuits for generating alternating currents of a frequency relatively high as compared with the frequencies of ordinary commercial power circuits.

This application is a division of my copending patent application Serial No. 353,133, filed August 17, 1940, which issued as U. S. Letters Patent No. 2,288,362 on June 30, 1942, and which is assigned to the assignee of this application.

In certain industrial applications as, for example, in systems for energizing high frequency induction furnaces, it is desirable to employ electric valve apparatus for generating alternating currents having frequencies relatively higher than commercial frequencies, and to derive the energy from alternating current circuits of commercial frequencies. Heretofore, the electric valve frequency changers of oscillator circuits which have operated from commercial alternating current supply circuits have been characterized by certain undesirable features. Among these undesirable features have been uneven distribution of the power demanded from the phases of the alternating current supply circuit, imposition of low power factor conditions, imposition of heavy single phase load on polyphase systems, low efficiency small utilization factor of the electric valve or electronic discharge devices employed, high initial cost and complexity of associated control circuit design. In accordance with the teachings of my invention described hereinafter, I provide new and improved electric valve frequency changer or electric valve oscillator circuits energized from an alternating current source of commercial frequency, and which obviate all of the above-mentioned disadvantages of the prior art arrangements.

It is an object of my invention to provide new and improved electric valve frequency changer circuits.

It is another object of my invention to provide new and improved electric valve oscillator circuits.

It is a further object of my invention to provide new and improved electric valve frequency changer circuits for energizing a relatively high frequency alternating current load circuit from an alternating current supply circuit of commercial frequency.

Briefly stated in the illustrated embodiments of my invention, I provide new and improved electric valve circuits for energizing a relatively high frequency alternating current load circuit, such as a high frequency induction furnace, from a polyphase source of alternating current of commercial frequency. The electric valve frequency changer may be energized from either a polyphase alternating current source or a single phase alternating current circuit and including a plurality of electronic discharge devices of the high vacuum type, each having an anode, a cathode and a control grid, and arranged to have each of the electronic discharge devices energized from, or associated with, a different one of the phase windings or different sections of the single phase winding in the event this system is energized from a single phase supply circuit. An oscillatory circuit, or a tank circuit, is connected to be energized by the phase windings and the electronic discharge devices. I provide new and improved circuits for energizing the grids of the electronic discharge devices so that the grid currents are reduced substantially or limited during the negative or inverse half cycles of anode-cathode voltage. The improved grid circuits are effective to increase the value of the negative unidirectional biasing potential selectively during the negative half cycles of anode-cathode voltage, serving as a protective means to limit the amount of grid current transmitted during the negative or inverse half cycles.

For a better understanding of my invention, reference may be had to the following description taken in connection with the accompanying drawings, and its scope will be pointed out in the appended claims.

Figure 1:
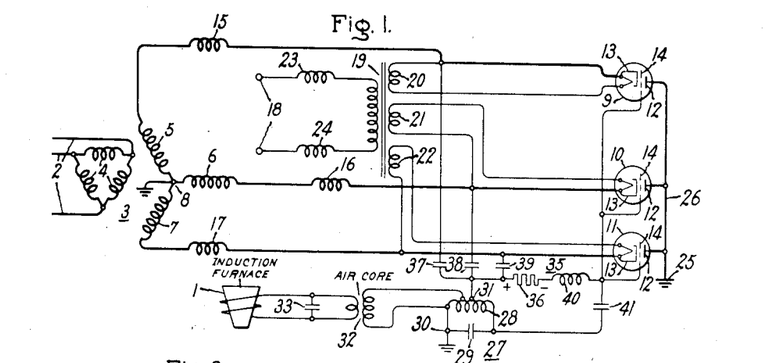
Fig. 1 diagrammatically illustrates an embodiment of my invention for energizing an induction furnace and in which the anodes of the electronic discharge devices are connected to ground potential through a common connection.

Referring now to Fig. 1 of the accompanying drawings, my invention is diagrammatically illustrated as applied to an electric translating system for energizing an alternating current load circuit 1 of relatively high frequency, such as an induction furnace from a polyphase alternating current supply circuit 2 of commercial frequency. The translating apparatus comprises an electric valve frequency changer or an electric valve oscillator including an inductive network, such as a transformer 3, having a plurality of primary windings 4 and a plurality of electrically displaced secondary or phase windings 5, 6 and 7. The secondary phase windings 5—7 may be connected in Y, having a common connection or a neutral connection 8 which may be connected to a point of reference potential, such as a ground connection. I provide a plurality of electric discharge paths each associated with a different one of the phase windings 5—7. For example, I employ a plurality of electronic discharge devices 9, 10 and 11 which are of the high vacuum type, each comprising a plurality of principal electrodes such as an anode 12, a cathode 13 and a control member or control grid 14. In the arrangement of Fig. 1, the cathodes 13 of electronic discharge devices 9—11 are connected to phase windings 5—7, respectively, through suitable smoothing inductive reactances 15, 16 and 17, respectively. Cathodes 13 may be energized from any suitable source of current, such as an alternating current circuit 18, through a transformer 19 having a plurality of secondary windings 20, 21 and 22. Inductances 23 and 24 may be connected in series relation with the primary winding of transformer 19 in order to absorb transients or high frequency currents which may be present in the circuit.

As a means for simplifying the circuit connections and as a means for effecting precise control of the operation of the electronic discharge devices 9—11, I connect corresponding principal electrodes, such as anodes 12 of all the electronic discharge devices 9—11, to a suitable point of reference potential, such as ground connection 25, through a suitable common conductor 26.

An oscillatory circuit or a tank circuit 27 is connected to be energized by the phase windings 5—7 and electronic discharge devices 9—11. The oscillatory or tank circuit 27 may be of any conventional type and may comprise a parallel connected inductance 28 and a capacitance 29. A suitable point 30 of the tank circuit 27 may be connected to ground or to a point of reference potential. The inductance 28 may be provided with a tap 31 for connection to the control or grid circuit to be described hereinafter. The load circuit 1, which in the arrangement illustrated comprises an induction furnace, may be coupled to the tank circuit 27 in any suitable manner, and for the purposes of illustration I have shown it as being connected to the inductance 28 of the tank circuit 27. An air core transformer 32 may be employed to transform the power to the desired current and voltage relationship for the proper energization of the load circuit 1, and, if desired, a power factor corrective impedance, such as a capacitance 33 for an inductive load or an inductance for a capacitive load, may be connected in circuit to improve the power factor conditions depending upon the reactive character of the load circuit.

I provide a single grid circuit 35 which is common to all of the control grids 14 of the electronic discharge devices 9—11 and which impresses on these control grids a negative unidirectional biasing potential of substantial magnitude, in order to prevent transmission of large grid currents by these electronic discharge devices during the negative half cycles of applied anode-cathode voltage and to establish the proper operating point during the positive half cycles, and to thereby prevent injury to these devices.

Of course, the high frequency component of voltage is also impressed on the control members 14 by virtue of the connection of the control circuit 35 to the tank circuit 27, and the resultant voltage impressed on the control grids 14 is the resultant or sum of the unidirectional biasing potential and the high frequency component of voltage. The control circuit 35 utilizes the grid rectification characteristic of the electronic discharge devices 9—11 and produces a negative unidirectional biasing potential by virtue of this characteristic. The control circuit 35 comprises a suitable impedance element, such as a resistance 36, which is energized by the unidirectional current transmitted between the cathode 13 and the control grids 14 of electronic discharge devices 9—11. Cathode feed capacitances 37, 38 and 39 are connected in the manner shown between the cathodes and the control circuit 35 to transmit the alternating components of current. A suitable smoothing inductance or choke 40 may be connected in series relation with the resistance 36. It will be noted that the left-hand terminal of the resistance 36, viewed in the drawings, is connected to tap 31 of inductance 28, thereby providing a path to ground potential or to the point of reference potential. A grid blocking capacitance or condenser 41 is connected between the grids 14 and the tank circuit 27.

It will be observed that the capacitances 37, 38 and 39 are each connected between a different one of the phase windings 5, 6 and 7 and the associated electronic discharge devices 9, 10 and 11, respectively, and are also connected to the tank circuit. These capacitances provide a path for the high frequency impulses occasioned by the operation of the electronic discharge devices 9—11.

The general principles of operation of the embodiment of my invention diagrammatically illustrated in Fig. 1 will be explained by considering the system when it is operating to transmit relatively high frequency alternating current, as for example alternating current within the region of 10,000 to 50,000 cycles, to the load circuit 1 from the alternating current supply circuit 2 which may be of a commercial frequency, such as 60 cycles. The electronic discharge devices 9, 10 and 11 conduct current in a predetermined order determined by the phase voltage of the voltages of windings 5, 6 and 7. Each electronic discharge device conducts current for a substantial part of the positive half cycle of applied anode-cathode voltage, and by virtue of this control conducts current for a portion of that time with each of the other electronic discharge devices. I have found that each of the electronic discharge devices 9, 10 and 11 conducts current for a period greater than $2\pi/n$ electrical degrees within each positive half cycle of anode-cathode voltage applied thereto from the supply circuit, where $n$ is equal to the number of phases of a polyphase circuit. For example, in the embodiment illustrated in Fig. 1, where the supply circuit 2 is a three-phase circuit, each of the electronic discharge devices conducts current for a period substantially greater than 120 electrical degrees.

Power is transmitted to the oscillatory or tank circuit 27 from the phase windings 5, 6 and 7 by the operation of the electronic discharge devices 9, 10 and 11. Each of the electronic discharge devices 9, 10 and 11 transmits high frequency electrical impulses during the positive half cycle of applied anode-cathode voltage of the low frequency alternating voltage provided by the phase windings 5, 6 and 7, respectively. The high frequency current flows through a circuit including electronic discharge devices 9, 10 or 11, capacitances 37, 38 or 39, the left-hand portion of inductance 28, terminal 30 and ground 25. The rectified low frequency current flows through phase winding 5, 6 or 7, inductance 15, 16 or 17, electronic discharge device 9, 10 or 11, conductor 26, ground 25, and terminal 8.

Because each of the electronic discharge devices 9, 10 and 11 transmits high frequency alternating currents, the potentials of the cathodes 13 rise and fall in accordance with the high frequency voltage variations and these high frequency impulses are transmitted to the oscillatory circuit or tank circuit 27 through capacitances 37, 38 and 39. High frequency alternating current is transmitted to the load circuit 1 from the oscillatory or tank circuit 27 through transformer 32.

By utilizing the grid rectification characteristic of the system and the operation of the control circuit 35, there is provided a substantial negative unidirectional biasing potential derived from the low frequency supply circuit 2, thereby affording a protection by limiting the grid currents transmitted by the electronic discharge devices 9—11 during the negative half cycles of applied anode-cathode voltage as well as aiding in the control of the current during the positive half cycles so that high power conversion efficiency may be attained. The source of grid excitation which is common to all the control grids 14 is present at all times, and the electronic discharge devices 9—11 conduct current as soon as the anodes become positive with respect to the cathodes.

Figure 2:
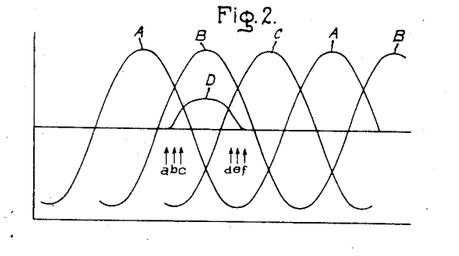
Figs. 2 and 3 represent certain operating characteristics thereof.
Figure 3:
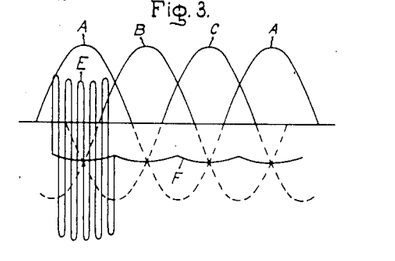

For a better understanding of the operation of the embodiment of my invention shown in Fig. 1, reference may be had to Fig. 2 and Fig. 3 which show certain operating characteristics thereof. Curves A, B and C of Fig. 2 represent the anode-cathode voltages of the electronic discharge devices 9, 10, and 11, respectively. At time (a) electronic discharge device 10 begins to conduct power to the oscillating system, since it is fully excited by oscillations generated by electronic discharge device 9. During the interval a—b, it may be considered that electronic discharge device 10 is an amplifier driven by electronic discharge device 9. During the interval b—e, discharge device 10 operates as an oscillator, and in turn drives discharge device 9 during the interval b—c, and drives discharge device 11 during the interval d—e.

Each of the electronic discharge devices 9, 10 and 11 conducts current for a period greater than the 120 electrical degree period and consequently has a utilization factor greater than $2\pi/n$ and less than 0.5, where $n$ is the number of phases of the translating apparatus. In the embodiment of the invention illustrated in Fig. 1, of course, $n$ is equal to 3. An important advantage of high frequency electronic generators, built in accordance with my invention, is the fact that the system operates to energize continuously the high frequency load circuit even during the commutating periods established by the anode-cathode voltages of the low frequency alternating current supply circuit. Oscillographic studies of the high frequency voltage supplied to the load circuit indicate that this voltage is continuous and that the commutation of current between the electronic discharge devices 9, 10 and 11 is effected in a smooth and positive manner. This transfer of current during the commutation intervals is effected by virtue of the control circuit which interconnects the grids 14 of discharge devices 9, 10 and 11 with the alternating current supply circuit.

The operating characteristics of Fig. 3 represent the manner in which the negative unidirectional biasing potential is produced by control circuit 35, particularly the voltage appearing across the resistance 36. Curve E represents the high frequency component of voltage derived from the tank circuit 27, through capacitance 41, and curve F represents the negative unidirectional biasing potential impressed on all of the control grids 14. Of course, curve F also represents the voltage appearing across the terminals of resistance 36. It will be noted that the wave form of the voltage of curve F is substantially that of the rectified voltage obtained by rectifying the three phase voltages provided by phase windings 5, 6 and 7. It is also emphasized that the biasing voltage is derived from the supply circuit 2 and is always of a substantial value to prevent the conduction of an excessive amount of grid current by the electronic discharge devices during those intervals in which it is desirable to limit the current conducted.

Among the principal advantages of my invention, it will be appreciated that inasmuch as the electronic discharge devices conduct current during a large part of each positive half cycle of applied anode-cathode voltage, the power demanded from the polyphase alternating current supply circuit 2 remains substantially constant, and that there is no phase unbalance inasmuch as the load is derived equally from all phases.

Figure 4:
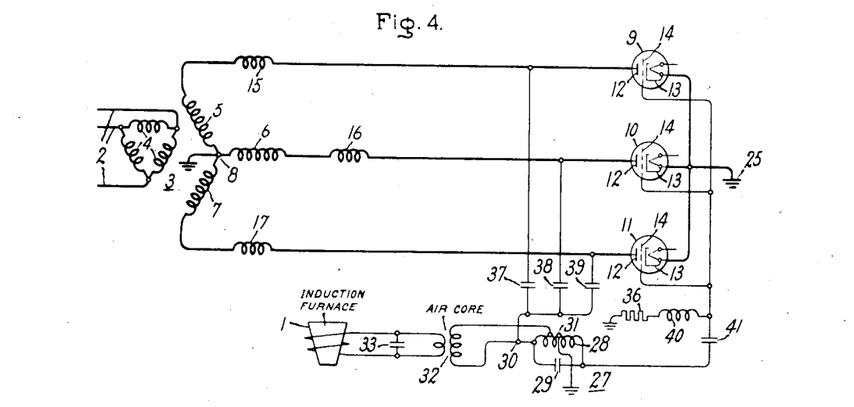
Fig. 4 diagrammatically illustrates an embodiment of my invention in which the cathodes are common and are connected to ground through a common connection.

Fig. 4 diagrammatically illustrates an embodiment of my invention which is a modification of the arrangement shown in Fig. 1, and corresponding elements have been assigned like reference numerals. In the arrangement of Fig. 4, the cathodes have a common connection and are connected to a point of reference potential, such as ground, and the anodes are connected to the phase windings 5, 6 and 7. In the modified arrangement of Fig. 4, the left-hand terminal of the resistance 36 is connected to the reference or ground potential, and the common juncture of the capacitances 37, 38 and 39 is connected to terminal 30 of inductance 28 instead of being connected to the tap 31. Tap 31 is connected to a point of reference potential or to ground.

Figure 5:
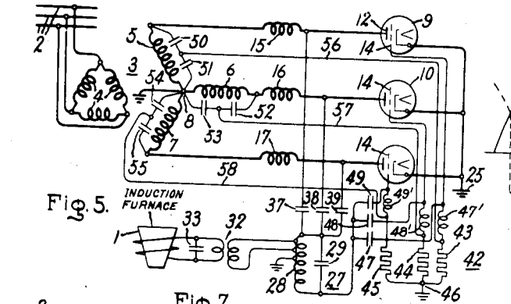
Figs. 5 and 7 represent certain modifications of my invention, and Figs. 6 and 8, respectively, represent certain operating characteristics thereof.

Fig. 5 diagrammatically illustrates another modification of my invention as applied to a high-frequency electronic generator. The arrangement of Fig. 5 is similar in many respects to that shown in Fig. 1 and corresponding elements have been assigned like reference numerals. The arrangement of Fig. 5 comprises means for impressing on the grids 14 negative unidirectional biasing potentials which vary in magnitude in a manner to limit the grid currents during the negative or inverse negative half cycles of applied anode-cathode voltage. That is, means are provided to increase in magnitude the negative unidirectional biasing potential during the inverse half cycles in order to limit the grid currents during these half cycles. I provide a control circuit 42 comprising impedance elements such as resistances 43, 44, and 45 which are connected to grids 14 of electronic discharge devices 9, 10, and 11, respectively. The common juncture 46 of the resistances 43—45 are connected to ground, that is, are connected to the point of reference potential. The control circuit 42 is coupled by suitable means such as capacitances 47, 48, and 49 to the oscillatory circuit 27 as a means for transmititng the high-frequency components of voltage from oscillatory circuit 27 to the grids 14. I provide capacitances 50—55, inclusive, which are connected in pairs across the phase windings 5, 6 and 7 of the transformer 3. The neutral connections of the respectively associated parts of capacitances are connected to grids 14 of discharge devices 9, 10 and 11 through conductors 56, 57 and 58, respectively.

Suitable choke coils 47', 48' and 49' are associated with the grids 14 of electronic discharge devices 9, 10 and 11 to prevent the transmission of the high frequency impulses of circuit 27 to the transformer 3 and the resistances 43, 44, and 45.

The embodiment of my invention shown in Fig. 5 operates to transform alternating current of commercial frequency, such as 60 cycle alternating current, to alternating current of a relatively higher frequency, such as alternating current having a frequency lying within the range from 10,000 to 50,000 cycles per second.

One of the particular advantages of the arrangement shown in Fig. 5 is the fact that the control circuit 42 produces negative biasing potentials which become greater in value during the negative half cycles of applied anode-cathode voltage thereby limiting the grid currents during those half cycles and preventing damage or injury to the electronic discharge devices. Negative unidirectional biasing potentials are produced across the terminals of resistances 43—45 by the grid rectification characteristics of the electronic discharge devices 9—11. A 60 cycle component of potential is impressed on the grids 14 through conductors 56—58. The grid rectification characteristics of the discharge devices produce across the resistances 43—45 unidirectional biasing potentials due to the potential derived from the supply circuit 2 through capacitances 50—55 and transformer 3.

Figure 6:
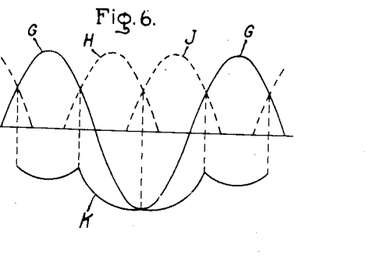

The manner in which the negative unidirectional potentials are increased in magnitude during the negative half cycles of applied anode-cathode voltage may be more readily appreciated by referring to the operating characteristics shown in Fig. 6. Curve G represents the low frequency anode-cathode voltage applied to one of the discharge devices, such as electronic discharge device 9 from circuit 2. Curves H and J represent the positive half cycles of voltage applied to electronic discharge devices 10 and 11. These latter curves are not shown completely; the negative cycles thereof are omitted for the purposes of clarity. Curve K represents the magnitude of the negative unidirectional biasing potential impressed on grid 14 or electronic discharge device 9. It will be understood that the biasing potentials impressed on grids 14 of discharge devices 10 and 11 are not represented, but that corresponding biasing potentials of the proper phase displacement are also impressed on these grids. The high frequency components of voltage which are impressed on the grids 14 are not represented in Fig. 6. It will be understood that such components are necessarily present and are impressed on grids 14 by coupling capacitances 47—49 from the oscillatory circuit 27.

During the positive half cycle of anode-cathode voltage impressed across discharge device 9 the negative biasing potential impressed on grid 14 is of a value sufficient to permit the discharge device 9 to transmit the desired high frequency impulses, the energy of course being derived from supply circuit 2 through secondary winding 5 of transformer 3. As the anode-cathode voltage becomes negative, I have found that the grid 14 tends to transmit a large amount of current. The grid tends to act as an anode relative to the anode 12. By providing the resistances 43—45, and in particular resistance 43 which acts as an individual resistor for device 10, this increase in current tends to increase the negative biasing potential appearing across the terminals of resistance 43 thereby serving as a self-limiting arrangement for maintaining the grid current below that value which would injure the electronic discharge device.

Figure 7:
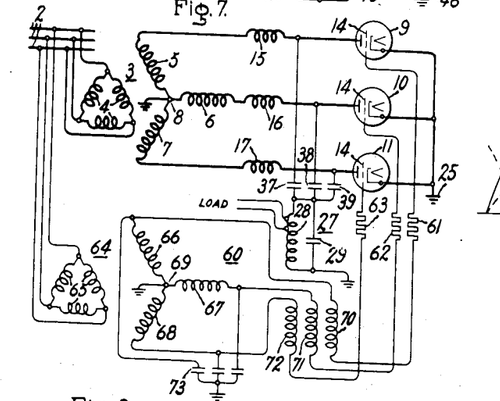

A still further embodiment of my invention is diagrammatically illustrated in Fig. 7. I provide a high frequency electronic generator energized from an alternating current circuit and which includes a control circuit 60 which impresses on the grids 14 of electronic discharge devices 9, 10 and 11 biasing potentials which vary in a manner during the negative half cycles of applied anode-cathode voltage to limit the grid currents. The control circuit 60 includes resistances 61, 62 and 63 connected in series relation with grids 14 and secondary windings 66, 67 and 68 of transformer 64, the primary windings 65 of which are connected to alternating current circuit 2. Neutral connection 69 of secondary windings 66—68 is connected to ground or to the point of reference potential.

The high frequency component of voltage for the grid excitation may be introduced into the control circuit 60 by means of windings 70, 71, and 72 which are inductively coupled to the oscillatory circuit 27. Suitable filtering means such as capacitances 73 may be connected across the windings 66—68 in a Y connection to ground to by-pass the high frequency components of voltage. The load circuit is shown as being connected to taps on the inductance 28.

Figure 8:
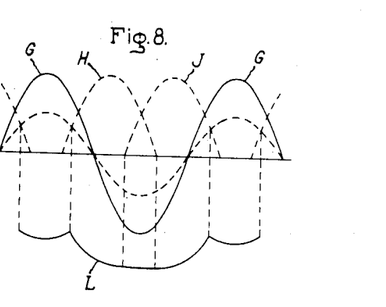

The arrangement of my invention shown in Fig. 7 operates to transform alternating current of commercial frequency to high frequency alternating current. Electronic discharge devices 9 and 11 conduct current in a predetermined order or sequence determined by the order of phase rotation of the voltages of the alternating current circuit 2. Each discharge device conducts current for substantially 120 electrical degrees, that is, conducts current during a substantial part of the positive half cycle of applied anode-cathode voltage. The alternating components of potential provided by secondary windings 66—68 are arranged to be in phase with the applied anode-cathode voltages of the respective electronic discharge devices 9—11. These windings, in conjunction with the resistances 61—63, produce and impress on the grids 15 negative biasing potentials varying in a manner represented by curve L of Fig. 8. Of course, it will be understood that only one biasing potential is shown and that the biasing potential represented by curve L is correlated with respect to curve G. For example, the curve L represents the biasing potential impressed on grid 14 of electronic discharge 9 when curve G represents the anode-cathode voltage of discharge device 9. Properly correlated biasing potentials are also impressed on grids 14 of devices 10 and 11.

It will be understood that a high frequency component of voltage will also be impressed on grids 14 by virtue of the coupling between the control circuit 60 and the oscillatory circuit 27. The arrangement of Fig. 7 serves to limit the grid currents during the negative half cycles of applied anode-cathode voltage, that is, during the negative half cycles of the low frequency source 2. Since the windings 66—68 produce voltages substantially in phase with the voltages produced by windings 5—7, the biasing potential impressed on the grids 14 necessarily increases in the negative direction during the negative half cycles of anode voltage thereby establishing a limit to the current which the grid circuits are required to conduct and consequently protect the electronic discharge devices.

Figure 9:
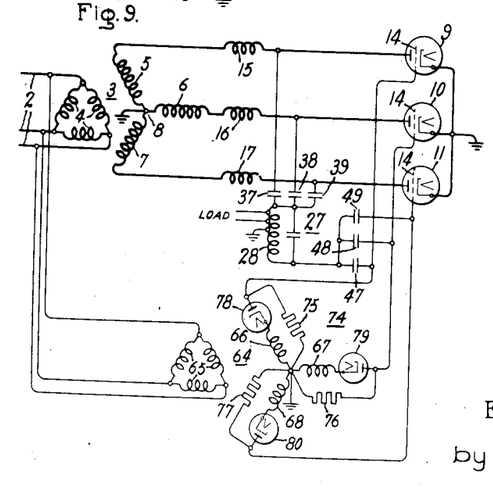
Figs. 9 and 10 also relate to modifications of arrangements for limiting the grid currents during the inverse or negative half cycles.

In Fig. 9 there is represented a still further embodiment of my invention having several elements corresponding to those shown in Fig. 5 and Fig. 7 and corresponding elements have been assigned like reference numerals. In order to impress on the grids 14 biasing potentials derived from the supply circuit 2 I provide a control circuit 74 comprising secondary windings 66—68 and impedance elements 75, 76 and 77 which are energized through rectifying devices 78, 79 and 80, respectively. The rectifying devices 78—80 transmit unidirectional currents through the resistances 75—77 to create thereacross negative unidirectional biasing potentials which occur during the negative half cycles of the applied anode-cathode voltage of the respective associated electronic discharge devices. In this manner the grid currents are limited during the inverse half cycles.

Figure 10:
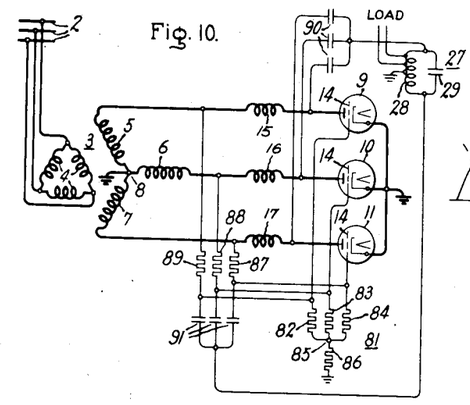

Fig. 10 diagrammatically illustrates another embodiment of my invention as applied to an electronic high frequency generator for energizing a high frequency load circuit from a source of alternating current of commercial frequency such as alternating current circuit 2. I provide a control circuit 81 which impresses on the grids 14 negative unidirectional biasing potentials derived from circuit 2 and obtaining by virtue of the grid rectification characteristics of the electronic discharge devices 9—11. The control circuit 81 comprises a plurality of impedance elements such as resistances 82, 83, and 84 connected to grids 14 of electronic discharge devices 9—11 respectively and are arranged to have a common connection 85. I also provide in control circuit 81 a resistance 86 connected between ground or the point of reference potential and the common connection 85 of resistances 82—84. The unidirectional biasing potentials impressed on grids 14 each comprises two components. One of these components is that which appears across the terminals of resistance 86 and is due to the summation or average of the grid rectification currents of all three of electronic discharge devices 9—11. The second component is that due to the flow of the individual grid rectification currents through the respective electronic discharge devices.

Control circuit 81 also comprises resistances 87, 88, and 89 which are connected between grids 14 of electronic discharge devices 9, 10, and 11 and secondary windings 7, 6, and 5, respectively. Oscillatory circuit 27 is coupled to the anodes of electronic discharge device 11 and to the control circuit 81 through groups of coupling capacitances 90 and 91, respectively.

Figure 11:
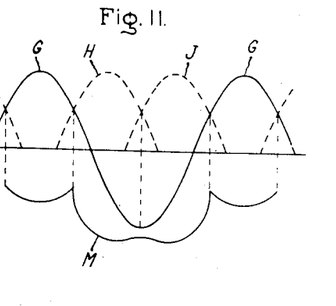
Fig. 11 represents certain operating characteristics of the arrangement shown in Fig. 10.

The manner in which the control circuit 81 of Fig. 10 serves to limit the magnitude of the grid currents during the negative or inverse half cycles of anode-cathode voltage may be more fully appreciated by referring to the operating characteristics shown in Fig. 11. Curves G, H and J represent the respective anode-cathode voltages of electronic discharge devices 9—11, respectively, and curve M represents the negative unidirectional biasing potential impressed on grid 14 of electronic discharge device 9. It will be observed that the magnitude of the biasing potential increases substantially during the negative or inverse half cycle. It will be further appreciated that the biasing potentials impressed on grids 14 of electronic discharge devices 10 and 11 will be of the same phase relationship relative to their respective anode-cathode voltages. The increase in the biasing potential, as illustrated by curve M, during the negative half cycles is affected by the increase of current which flows through resistance 82. As the anode potential of electronic discharge device 9 becomes negative relative to the cathode, the grid 14 conducts a greater amount of current effecting an increased potential drop across resistance 82. In this manner circuit 81 tends to limit the grid current by increasing its bias.

Figure 12:
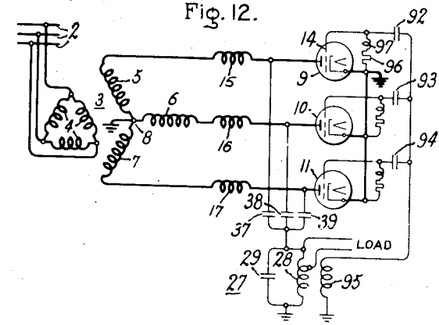
Fig. 12 is a further polyphase modification.

A further polyphase modification of a high frequency electronic generator is illustrated in Fig. 12. The grids 14 of electronic discharge device 9—11 are connected to the oscillatory circuit 27 through capacitances 92, 93, and 94 which are coupled to the oscillatory circuit by means of winding 95 which is inductively associated with inductance 28. Suitable filtering means such as a resistance 96 and an inductance 97 are connected between the cathodes and the grids of each of the electronic discharge devices 9—11. These filtering means serve to prevent the transmission of high frequency impulses derived from the oscillatory circuit 27 directly to ground.

Certain features of the arrangement shown in Fig. 12 are disclosed and claimed in my copending application Serial No. 388,704, filed April 15, 1941, patented June 30, 1942, Patent No. 2,288,364, which is a continuation-in-part of my copending application Serial No. 353,133, filed August 17, 1940, patented June 30, 1942, Patent No. 2,288,362, both of which are assigned to the assignee of this application.

Figure 13:
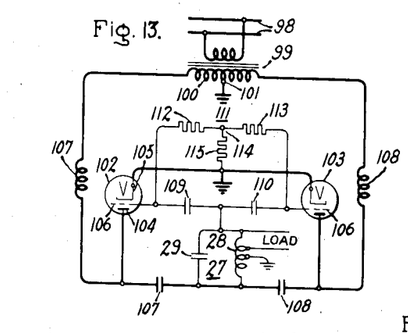
Figs. 13 and 14 represent modifications of my arrangement which are designed to operate from single phase alternating current.

Fig. 13 diagrammatically illustrates a modification of my invention as applied to an electronic frequency changer for energizing a high frequency load circuit from a single phase alternating circuit 98 which may be of commercial frequency such as 60 cycles. The system comprises a transformer 99 having a secondary winding 100 provided with an intermediate or neutral connection 101 connected to ground or connected to a point of reference potential. A pair of electronic discharge devices 102 and 103 are arranged to operate in a push-pull relationship and each is provided with an anode 104, a cathode 105, and a grid 106. Filtering inductances 107 and 108 are connected in series relation with the associated portions of secondary winding 100 and electronic discharge devices 102 and 103. Corresponding principal electrodes, such as cathodes 105 of discharge devices 102 and 103, are connected to the point of reference potential or to the ground connection. The oscillatory circuit 27 is coupled to the anodes 104 of discharge devices 102 and 103 through capacitances 107 and 108 respectively. In addition, the oscillatory circuit 27 is also coupled to the grids 106 through capacitances 109 and 110.

As a means for selectively increasing the biasing potential impressed on the grids 106 during the negative or inverse half cycles of the anode-cathode potential of discharge devices 102 and 103, I provide a control circuit 111 comprising resistances 112 and 113 having a common connection 114. A further resistance 115 is connected between the common connection 114 and the ground connection or the point of reference potential.

The embodiment of my invention shown in Fig. 13 operates to transform the alternating current of commercial frequency, derived from circuit 98, into alternating current of a higher frequency. Electronic discharge devices 102 and 103 alternately conduct low frequency alternating current and during the periods of conduction of low frequency current also transmit impulses of high frequency current. Of course, the high frequency excitation is derived from oscillatory circuit 27 through coupling capacitances 109 and 110.

Control circuit 111 produces unidirectional biasing potentials which increase during the negative half cycles of anode-cathode voltage. This selective variation in the magnitude of the biasing potential is obtained by virtue of the operation of resistances 112 and 113 acting in conjunction with resistance 115. Consider, as an example, one of the discharge devices such as discharge device 102 when its anode voltage becomes negative. The grid 106 tends to conduct an increased amount of unidirectional current causing an increase in the grid rectification current which flows between grid 106 and the ground connection through resistances 112 and 115 without materially interfering with the operation of device 103. In a like manner the biasing potentials impressed on grid 106 of discharge device 103 also increase during its inverse half cycles of anode-cathode voltage.

Figure 14:
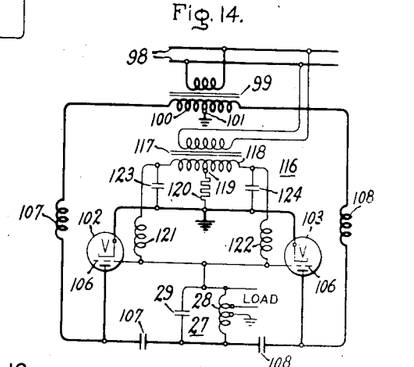

Fig. 14 represents diagrammatically a further single phase modification of my invention for energizing a high frequency load circuit from a source of commercial frequency. In the arrangement of Fig. 14 there is provided a control circuit 116 which impresses in the grids 106 of discharge devices 102 and 103 a component of voltage derived from supply circuit 98 through a transformer 117 having a secondary winding 118 provided with an intermediate or neutral connection 119. A resistance 120 is connected between the connection 119 and the ground or point of reference potential; and inductances 121 and 122 are connected between the secondary winding 118 and grids 106 to prevent the transmission of the high frequency impulses of circuit 27 to the transformer 117. Filtering capacitances 123 and 124 are also connected to by-pass the high frequency impulses so that these high frequency impulses are not transmitted to the transformer 117.

The single-phase arrangement of Fig. 14 operates to limit the grid currents during the negative half cycles of anode-cathode voltage, that is, during the negative half cycles of the low frequency component of voltage derived from supply circuit 98. The low frequency component of voltage introduced into control circuit 116 by means of transformer 117 together with the high frequency excitation operates to impress on the grids 106 a rectified unidirectional biasing voltage by virtue of the grid rectification characteristics of the electronic discharge devices 102 and 103. This biasing potential appears across the terminals of resistance 120 and the associated positions of secondary winding 118 thereby selectively producing the desired increase in grid biasing potential at the times when it is required.

The specific features of the modification of my invention shown in Fig. 13 is claimed in my copending application, Serial No. 388,703, filed April 15, 1941, patented June 30, 1942, Patent No. 2,288,363, which is a continuation-in-part of my application Serial No. 353,133, filed August 17, 1940, Patent No. 2,288,362, dated June 30, 1942, both of which are assigned to the assignee of the present application.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a polyphase alternating current supply circuit, a high frequency alternating current load circuit, electric translating apparatus connected between said circuits and comprising an electric oscillator including a plurality of electrically displaced windings and including a point of reference potential, a plurality of electronic discharge devices each connected to a different one of said windings and each including a plurality of principal electrodes and a control grid and an oscillatory circuit energized by said windings and said electronic discharge devices, corresponding principal electrodes of said electronic discharge devices being connected to said windings and different corresponding principal electrodes being connected to said point of reference potential, a control circuit for impressing on each of said control grids a biasing potential having a greater value during the negative half cycles of voltage of said supply circuit impressed across said principal electrodes than during the positive half cycles and comprising means including a polyphase inductive network energized from said supply circuit for impressing on each of the grids an alternating component of voltage having substantially the same phase relationship as the voltage applied across the associated principal electrodes and a plurality of resistances each connected in series relation from said point of reference potential through said inductive network to a different one of said grids to provide a negative biasing potential, and means for coupling said oscillatory circuit to said control circuit.

2. In combination, a polyphase alternating current supply circuit, a high frequency alternating current load circuit, electric translating apparatus connected between said circuits and comprising an electric oscillator including a plurality of electrically displaced windings and including a point of reference potential, a plurality of electronic discharge devices each connected to a different one of said windings and each including a plurality of principal electrodes and a control grid and an oscillatory circuit energized by said windings and said electronic discharge devices, corresponding principal electrodes of said electronic discharge devices being connected to said windings and different corresponding principal electrodes being connected to said point of reference potential, a control circuit for impressing on each of said grids a biasing potential having a greater negative value during the negative half cycles of voltage of said supply circuit applied between said principal electrodes than that applied during the positive half cycles of voltage and comprising a plurality of resistances having a common point connected to said point of reference potential and each being connected from said point of reference potential to a different one of said grids, a polyphase means energized from said supply circuit and exclusive of said oscillatory circuit for impressing on said grids potentials of the same frequency as the frequency of said supply circuit, and means for coupling said oscillatory circuit and said control circuit.

3. In combination, an alternating current supply circuit, a high frequency alternating current load circuit, electric translating apparatus connected between said circuits and comprising an electric oscillator including a plurality of electrically displaced windings and including a point of reference potential, a plurality of electronic discharge devices each connected to a different one of said windings and each including a plurality of principal electrodes and a control grid and an oscillatory circuit energized by said windings and said electronic discharge devices, corresponding principal electrodes of said electronic discharge devices being connected to said windings and different corresponding principal electrodes being connected to said point of reference potential, a control circuit for impressing on each of the grids a biasing potential having a greater negative value during the negative half cycles of voltage of said supply circuit applied between said principal electrodes than that applied during the positive half cycles and comprising a plurality of resistances having a common point connected to said point of reference potential and each being connected to a different one of said grids and means including a capacitance bridge connected across said windings for impressing on said grids voltages of the same periodicity as the voltage of said supply circuit and of substantially the same phase displacement as the voltage applied across the associated principal electrodes, and means for coupling said oscillatory circuit and said control circuit.

4. In combination an alternating current supply circuit, a high frequency alternating current load circuit, electric translating apparatus connected between said circuits and comprising an electric oscillator including a plurality of electrically displaced windings and including a point of reference potential, a plurality of electronic discharge devices each connected to a different one of said windings and each including a plurality of principal electrodes and a control grid and an oscillatory circuit energized by said windings and said electronic discharge devices, corresponding principal electrodes of said electronic discharge devices being connected to said windings and different corresponding principal electrodes being connected to said point of reference potential, a control circuit for impressing on each of the grids a resultant biasing potential having a greater negative value during the negative half cycles of voltage of said supply circuit applied between said principal electrodes than that applied to the positive half cycles of the voltage of said supply circuit and comprising a polyphase network energized from said supply circuit and including a plurality of phase windings having a common point connected to said point of reference potential for impressing on each of said grids an alternating component of voltage and a plurality of resistances connected in series relation with the windings of said inductive network and said grids to impress thereon negative unidirectional components of voltage obtained by the grid rectification characteristic of the associated electronic discharge devices, and means for coupling said oscillatory circuit and said control circuit.

5. In combination, an alternating current supply circuit, a high frequency alternating current load circuit, electric translating apparatus connected between said circuits and comprising an electric oscillator including a plurality of electrically displaced windings and including a point of reference potential, a plurality of electronic discharge devices each connected to a different one of said windings and each including a plurality of principal electrodes and a control grid and an oscillatory circuit energized by said windings and said electronic discharge devices, corresponding principal electrodes of said electronic discharge devices being connected to said windings and different corresponding principal electrodes being connected to said point of reference potential, a control circuit exclusive of said oscillatory circuit and comprising means including a plurality of resistances having a common juncture connected to said point of reference potential and each resistance being connected to a different one of the grids for impressing on the control grids negative unidirectional biasing potentials each having a greater negative value during the negative half cycles of voltage applied between said principal electrodes than that applied during the positive half cycles of voltage of said supply circuit thereby to limit the grid currents during the negative half cycle of voltage of said supply circuit, and means for coupling said control circuit to said oscillatory circuit.

6. In combination, an alternating current supply circuit, a high frequency alternating current load circuit, electric translating apparatus connected between said circuits and comprising an electric oscillator including a plurality of electrically displaced windings and including a point of reference potential, a plurality of electronic discharge devices each connected to a different one of said windings and each including a plurality of principal electrodes and a control grid and an oscillatory circuit energized by said windings and said electronic discharge devices, corresponding principal electrodes of said electronic discharge devices being connected to said windings and different corresponding principal electrodes being connected to said point of reference potential, a control circuit for impressing on each of the grids a biasing potential having a greater negative value during the negative half cycles of voltage applied between said principal electrodes than that applied during the positive half cycles of voltage of said supply circuit and comprising means exclusive of said oscillatory circuit for impressing thereon an alternating component of voltage of the frequency of said supply circuit and a unidirectional component of voltage obtained by the grid rectification characteristic of the associated electronic discharge device thereby limiting the magnitude of the grid current conducted during the negative half cycles, and means for coupling said oscillatory circuit and said control circuit.

7. In combination, an alternating current supply circuit, a high frequency alternating current load circuit, electric translating apparatus connected between said circuits and comprising an electric oscillator including a plurality of electrically displaced windings having a common juncture, a point of reference potential, said common juncture being connected directly to said point of reference potential, a plurality of electronic discharge devices each connected to a different one of said windings and each including a plurality of principal electrodes, comprising an anode, a cathode and a control grid and an associated oscillatory circuit energized by said windings and said electronic discharge devices, corresponding principal electrodes of said electronic discharge devices being connected to said windings and different corresponding electrodes being connected directly to said point of reference potential, a control circuit comprising means exclusive of the anode-cathode circuits of said electronic discharge devices for impressing on each of the grids a biasing potential having a greater negative value during the negative half cycles of voltage applied between said principal electrodes than that applied during the positive half cycles of voltage of said supply circuit and comprising means exclusive of said oscillatory circuit for supplying to said last mentioned means alternating components of voltage of the frequency of said supply circuit to produce unidirectional components of voltage obtained by the grid rectification characteristic of the associated electronic discharge devices thereby limiting the magnitude of the grid currents conducted during the negative half cycles of applied anode-cathode voltage, and means for coupling said oscillatory circuit and said grid circuit.

8. In combination, an alternating current supply circuit, a high frequency alternating current load circuit, electric translating apparatus connected between said circuits and comprising an electric oscillator including a plurality of electrically displaced windings and including a point of reference potential, a plurality of electronic discharge devices each connected to a different one of said windings and each including a plurality of principal electrodes, comprising an anode and a cathode, and a control grid and an oscillatory circuit energized by said windings and said electronic discharge devices, corresponding principal electrodes of said electronic discharge devices being connected to said windings and different corresponding principal electrodes being connected directly to said point of reference potential, a control circuit exclusive of the anode-cathode circuits of said electronic discharge devices for impressing on said grids a biasing potential having a greater negative value during the negative half cycles of voltage of said supply circuit applied between said principal electrodes than that applied during the positive half cycles of voltage of said supply circuit and comprising a plurality of resistances having a common connection and each being connected to a different one of the grids, a resistance connected between said point of reference potential and said common connection, means for connecting said grids to be responsive to the voltage of the associated first mentioned winding, and means for coupling said control circuit to said oscillatory circuit.

9. In combination, an alternating current supply circuit, an alternating current load circuit of a frequency high relative to the frequency of said supply circuit, electric translating apparatus connected between said circuits and comprising an electric oscillator including a plurality of electrically displaced windings and having a common juncture, said common juncture being connected to a point of reference potential, a plurality of electronic discharge devices each connected to a different one of said windings and each having a plurality of principal electrodes and a control electrode and an oscillatory circuit energized by said windings and said electronic discharge devices, corresponding principal electrodes of said electronic discharge devices being connected to said windings and different corresponding principal electrodes being connected to said point of reference potential, a plurality of non-inductive control circuits for energizing the control electrodes and each having a point connected to said point of reference potential and each comprising means energized from said windings and an impedance element energized by said last mentioned means and each impedance element being connected from said point of reference potential to a different one of the control electrodes to impress thereon negative unidirectional biasing potentials having a greater magnitude during the negative half cycles of voltage of said supply circuit applied between the associated principal electrodes than during the positive half cycles of the voltage of said supply circuit, and means for coupling said oscillatory circuit to said control circuit.

10. In combination, an alternating current supply circuit, an alternating current load circuit of a frequency high relative to the frequency of said supply circuit, electric translating apparatus connected between said circuits and comprising an electric oscillator including a plurality of electrically displaced windings and having a common juncture, said common juncture being connected to a point of reference potential, a plurality of electronic discharge devices each connected to a different one of said windings and each having a plurality of principal electrodes and a control electrode and an oscillatory circuit energized by said windings and said electronic discharge devices, corresponding principal electrodes of said electronic discharge devices being connected to said windings and different corresponding principal electrodes being connected to said point of reference potential, a control circuit for energizing the control electrodes having a point connected to said point of reference potential and comprising non-inductive means energized from said windings and a plurality of star-connected impedance elements energized from said non-inductive means and each connected from said point of reference potential to a different one of the control electrodes to impress thereon negative unidirectional biasing potentials having greater magnitudes during the negative half cycles of said supply circuit applied between the respective principal electrodes than during the positive half cycles of the voltage of said supply circuit, and means for coupling said oscillatory circuit to said control circuit.

11. In combination, an alternating current supply circuit, an alternating current load circuit of a frequency high relative to the frequency of said supply circuit, electric translating apparatus connected between said circuits and comprising an electric oscillator including a plurality of electrically displaced windings and having a common juncture, said common juncture being connected to a point of reference potential, a plurality of electronic discharge devices each connected to a different one of said windings and each having a plurality of principal electrodes and a control electrode and an oscillatory circuit energized by said windings and said electronic discharge devices, corresponding principal electrodes of said electronic discharge devices being connected to said windings and different corresponding principal electrodes being connected to said point of reference potential, a control circuit for energizing the control electrodes and having a point connected to said point of reference potential and comprising non-inductive means energized from said windings and including a plurality of star-connected impedance elements energized from said non-inductive means and an impedance element connected between the common juncture of the first-mentioned impedance elements and said point of reference potential to impress on the control electrodes negative unidirectional biasing potentials having a greater magnitude during the negative half cycles of voltage of said supply circuit applied between the associated principal electrodes than during the positive half cycles of the voltage of said supply circuit, and means for coupling said oscillatory circuit to said control circuit.

12. In combination, an alternating current supply circuit, an alternating current load circuit of a frequency high relative to the frequency of said supply circuit, electric translating apparatus connected between said circuits and comprising an electric oscillator including a plurality of electrically displaced windings and having a common juncture, said common juncture being connected to a point of reference potential, a plurality of electronic discharge devices each connected to a different one of said windings and each having a plurality of principal electrodes and a control electrode and an oscillatory circuit energized by said windings and said electronic discharge devices, corresponding principal electrodes of said electronic discharge devices being connected to said windings and different corresponding principal electrodes being connected to said point of reference potential, a control circuit for energizing the control electrodes and having a point connected to said point of reference potential and comprising means energized from said supply circuit for providing alternating voltages of supply circuit frequency, and means exclusive of said oscillatory circuit and comprising a plurality of impedance elements energized from the last mentioned means and each connected from said point of reference potential to a different one of the control electrodes to impress thereon negative unidirectional potentials having greater magnitudes during the negative half cycles of voltage of said supply circuit applied between the associated principal electrodes than during the positive half cycles of applied anode-cathode voltage, and means for coupling said oscillatory circuit to said control circuit.

13. In combination, an alternating current supply circuit, an alternating current load circuit of a frequency high relative to the frequency of said supply circuit, electric translating apparatus connected between said circuits and comprising an electric oscillator including a plurality of electrically displaced windings and having a common juncture, said common juncture being connected to a point of reference potential, a plurality of electronic discharge devices each connected to a different one of said windings and each having a plurality of principal electrodes and a control electrode and an oscillatory circuit energized by said windings and said electronic discharge devices, corresponding principal electrodes of said electronic discharge devices being connected to said windings and different corresponding principal electrodes being connected to said point of reference potential, a control circuit for energizing the control electrodes and comprising means energized from said supply circuit for providing sinusoidal alternating voltage of supply circuit frequency and means exclusive of said oscillatory circuit and comprising a plurality of resistances energized from the last mentioned means and each connected in circuit from said point of reference potential to a different one of the control electrodes to impress thereon negative unidirectional biasing potentials having greater magnitudes during the negative half cycles of voltage applied to the associated principal electrodes than during the positive half cycles of voltage applied thereto, and means for coupling said oscillatory circuit to said control circuit.

14. In combination, an alternating current supply circuit, an alternating current load circuit of a frequency high relative to the frequency of said supply circuit, electric translating apparatus connected between said circuits and comprising an electric oscillator including a plurality of electrically displaced windings and having a common juncture, said common juncture being connected to a point of reference potential, a plurality of electronic discharge devices each connected to a different one of said windings and each having a plurality of principal electrodes and a control electrode and an oscillatory circuit energized by said windings and said electronic discharge devices, corresponding principal electrodes of said electronic discharge devices being connected to said windings and different corresponding principal electrodes being connected to said point of reference potential, a control circuit for energizing the control electrodes and having a point connected to said point of reference potential and comprising means energized from said supply circuit for providing alternating voltages of supply circuit frequency, means exclusive of said oscillatory circuit and comprising a plurality of impedance elements energized from the last mentioned means and each connected between said point of reference potential and a different one of said control electrodes to impress thereon negative unidirectional biasing potentials which selectively increase in magnitude during those intervals of time during cycles of supply circuit voltage within which corresponding principal electrodes of other electric discharge devices are subjected to more positive voltages.

15. In combination, an alternating current supply circuit, an alternating current load circuit of a frequency high relative to the frequency of said supply circuit, electric translating apparatus connected between said circuits and comprising an electric oscillator including a plurality of electrically displaced windings and having a common juncture, said common juncture being connected to a point of reference potential, a plurality of electronic discharge devices each connected to a different one of said windings and each having a plurality of principal electrodes and a control electrode and an oscillatory circuit energized by said windings and said electronic discharge devices, corresponding principal electrodes of said electronic discharge devices being connected to said windings and different corresponding principal electrodes being connected to said point of reference potential, a control circuit for energizing the control electrodes and having a point connected to said point of reference potential and comprising means energized from said supply circuit for providing alternating voltages of supply circuit frequency, and means exclusive of said oscillatory circuit and comprising a plurality of impedance elements energized from the last mentioned means and each connected between said point of reference potential and a different one of the control electrodes to impress on the associated control electrodes a negative unidirectional biasing potential which increases in magnitude during each cycle of voltage of the supply circuit during an interval within which a corresponding principal electrode of any other electric discharge device is subjected to a greater voltage.

16. In combination, an alternating current supply circuit, an alternating current load circuit of a frequency high relative to the frequency of said supply circuit, electric translating apparatus connected between said circuits and comprising an electric oscillator including a plurality of electrically displaced windings having a common juncture, said common juncture being connected to a point of reference potential, a plurality of electric discharge devices each having an anode connected to a different one of said windings and each having a cathode connected to said point of reference potential and an oscillatory circuit energized by said windings and said electric discharge devices, and a control circuit for energizing said control electrodes and having a point connected to said point of reference potential and comprising means energized from said supply circuit for providing voltages of supply circuit frequency, means exclusive of said oscillatory circuit energized from the last mentioned means and comprising a plurality of impedance elements for impressing on each of the control electrodes a negative unidirectional biasing potential which increases in magnitude during each cycle of voltage of the supply circuit during that interval within which the other electric discharge devices conduct current through the anode-cathode circuits.

ELMER D. McARTHUR.